US012656529B1

(12) United States Patent
Teder

(10) Patent No.: US 12,656,529 B1
(45) Date of Patent: Jun. 16, 2026

(54) SPINNING-BOWL PRECIPITATION GAUGE AND METHOD

(71) Applicant: Hydreon Corporation, Eden Prairie, MN (US)

(72) Inventor: Rein S. Teder, Eden Prairie, MN (US)

(73) Assignee: Hydreon Corporation, Eden Prairie, MN (US)

( * ) Notice: Subject to any disclaimer, the term of this patent is extended or adjusted under 35 U.S.C. 154(b) by 165 days.

(21) Appl. No.: 18/842,703

(22) PCT Filed: Sep. 11, 2023

(86) PCT No.: PCT/US2023/032442
    § 371 (c)(1),
    (2) Date: Aug. 29, 2024

(87) PCT Pub. No.: WO2024/242689
    PCT Pub. Date: Nov. 28, 2024

Related U.S. Application Data

(60) Provisional application No. 63/468,338, filed on May 23, 2023.

(51) Int. Cl.
    *G01W 1/14* (2006.01)
(52) U.S. Cl.
    CPC .................................... *G01W 1/14* (2013.01)
(58) Field of Classification Search
    CPC ................................. G01W 1/14; G01W 1/02
    See application file for complete search history.

(56) References Cited

U.S. PATENT DOCUMENTS

| | | | |
|---|---|---|---|
| 3,705,533 A | 12/1972 | Kahl et al. | |
| 3,958,457 A | 5/1976 | Mink | |
| 4,476,718 A | 10/1984 | Plank et al. | |
| 5,571,963 A | 11/1996 | Balchin et al. | |
| 6,044,699 A | 4/2000 | Greenblatt et al. | |
| 7,540,186 B2 | 6/2009 | Jeong et al. | |

(Continued)

FOREIGN PATENT DOCUMENTS

| | | | | |
|---|---|---|---|---|
| KR | 101426782 B1 | * | 8/2014 | ............. H01H 35/18 |
| KR | 102106563 B1 | | 5/2020 | |

OTHER PUBLICATIONS

"International Preliminary Report on Patentability (Chapter II) for parent PCT Patent Application No. PCT/ US2023/032442, mailed Aug. 21, 2024, 19 pages."

*Primary Examiner* — Son T Le
(74) *Attorney, Agent, or Firm* — Charles A. Lemaire; Lemaire Patent Law Firm, P.L.L.C.

(57) ABSTRACT

Apparatus and method for automatically measuring precipitation using a precipitation-collection bowl configured to selectively spin around a vertical axis under control of a controller in order to empty, from time-to-time, any collected precipitation, as well as expelling debris that may land on the bowl. In some embodiments, a load cell is configured to weigh the bowl and collected water to determine the amount of collected precipitation and report the amount of collected precipitation to external equipment. Some embodiments use an electrical motor, such as a gearmotor or stepper motor, to spin the bowl. Some embodiments periodically measure the weight of the motor and bowl, and detect debris by sensing a sudden short-term change in a rate of measured precipitation.

32 Claims, 8 Drawing Sheets

(56) References Cited

U.S. PATENT DOCUMENTS

| 7,633,398 | B2 | 12/2009 | DuFaux et al. |
| 8,271,198 | B2 | 9/2012 | Teder |
| 2009/0120179 | A1 | 5/2009 | Nylander et al. |
| 2018/0341042 | A1 | 11/2018 | Soltani |

\* cited by examiner

SPINNING-BOWL PRECIPITATION GAUGE AND METHOD

CROSS-REFERENCE TO RELATED APPLICATIONS

This application is a national-phase filing of, and claims priority benefit of, PCT Patent Application No. PCT/US2023/032442, filed Sep. 11, 2023 by Rein S. Teder and titled "Spinning-bowl precipitation gauge and method," which claims priority benefit, including under 35 U.S.C. § 119(e), of U.S. Provisional Patent Application 63/468,338 titled "Spinning bowl precipitation gauge" filed May 23, 2023 by Rein S. Teder, each of which is hereby incorporated by reference in its entirety.

FIELD OF THE INVENTION

The present invention relates to precipitation gauges and more particularly to precipitation gauges wherein the water collected by the gauge is expelled by centrifugal force.

BACKGROUND OF THE INVENTION

Rainfall and other forms of precipitation have been measured using the tipping-bucket-style rain gauge since Christopher Wren invented it in 1662. The principle is simple: water collects through a funnel and fills a tiny bucket. Once a predetermined amount of water has been collected, the weight of the water causes the bucket to tip, and gravity empties the bucket. There have been numerous enhancements in the years since, such as using a pair of connected buckets and magnetic sensors to count the number of tips as exemplified by Kahl in U.S. Pat. No. 3,705,533, which is hereby incorporated by reference in its entirety. In this and in Wren's original embodiment, the force of gravity is the means by which water is removed from the bucket.

The primary shortfall of tipping-bucket rain gauges is that they are subject to clogging. Blown debris such as leaves or material from birds building nests in such gauges collects in the funnel and may clog it or clog the bucket. A tipping bucket deployed in a location well suited for collecting rain is generally also well suited for birds to build a nest. Measures to impede birds that do not impede the collection of rainfall are only so effective. Tipping buckets afford no way to eject debris, and debris collects indefinitely. It is well understood in the field of meteorology that tipping-bucket rain gauges require periodic cleaning and maintenance. In practice, a typical tipping bucket must be maintained roughly once a year.

Additionally, tipping-bucket rain gauges are limited by their inability to measure small quantities of rain or provide more accuracy than the size of the bucket. These difficulties arise because the bucket cannot measure rainfall that is less than one full tip. The resolution of such devices is thus one tip. Exacerbating this, water must collect on the funnel before it flows down to reach the bucket. In practice, tipping buckets usually measure in increments of 0.2 mm (or 0.01 inches). Further, tipping buckets typically do not report the onset of rain until after a few times that much precipitation. An accumulation of less than 0.6 mm (or 0.03 inches) is generally ignored. These minimum measurable amounts, quantization, and delays, all adversely affect the accuracy of the prior-art rain gauges.

To overcome the inability of tipping buckets to measure small amounts, weighing has been used as a means of determining an amount of rainfall, as exemplified in U.S.

Pat. No. 6,044,699, which is hereby incorporated by reference in its entirety. Weighing schemes are generally disposed to measure small amounts of water accumulation which are not sufficient to tip a bucket. Again, gravity is the means by which such collecting devices are emptied, either by valve or manually emptying the bucket. One commercially available system sold by Geonor A/S of Norway requires that the bucket be emptied by a human as part of regular maintenance. Mink taught in U.S. Pat. No. 3,958,457 (which is hereby incorporated by reference in its entirety) that a motor may be used to tip the bucket, but gravity is still the means of emptying the bucket. U.S. Pat. No. 7,633,398 (which is hereby incorporated by reference in its entirety) shows that the height of collected water may be measured optically, and the collected water may be allowed to run out via a valve. These devices are generally much more complex than conventional tipping buckets and do not address the clogging issue.

The issues of clogging and sensitivity to small amounts of rainfall may be addressed by using means that do not directly measure the volume or weight of the water. Numerous technologies such as conductive, piezoelectric, or optical exist. These are exemplified by an optical sensor taught by Teder in U.S. Pat. No. 8,271,198 (which is hereby incorporated by reference in its entirety), which is free from the issues of clogging, and is sensitive to small amounts of water. All of these technologies, however, attempt to correlate the volume of water with some other property of water, such as optical properties or conductivity. This correlation can only be so closely aligned, and all of these approaches suffer significant accuracy limitations. Furthermore, these sensors also rely on gravity to clear water from the sensing region.

A further shortfall of tipping buckets is that they are not suited to collecting snow. While tipping-bucket rain gauges are optimized for measuring rain, precipitation can take on a spectrum of forms ranging from rain, to mist, to freezing rain, and snow. Freezing rain has a tendency to form ice on surfaces, including on the workings of a tipping bucket. Snow gathers and stays in the collecting funnel, rather than actuating the tipping of the bucket. This may be overcome with a heater to melt the snow, but rain gauges are by nature very exposed and not easy to heat. A heating system requires additional components, and a heater requires considerable energy. As rain gauges are often mounted in remote locations, they are commonly solar powered. Such a power source is not always suitable for the power requirements of a heater. U.S. Pat. No. 5,571,963 taught that antifreeze may be used to melt the snow, but this solution requires maintenance.

Yet another shortcoming of tipping buckets is they suffer inaccuracies at high flow rates. The bucket does not collect water during the time it takes to tip, and thus under-reports that amount of water. This could be compensated for by software external to the sensor, but most commercial tipping buckets do not provide the information that would be required to do so. Thus, rain-gauge installations under-report for small amounts of rain and at very high rates of rainfall.

In sum, application of the prior art of precipitation gauges has been impeded by the absence of a system that is both accurate and low-maintenance. The prior art has typically been further limited by quantization, an inability to measure small amounts of water, and an inability to measure all forms of precipitation. Additionally, the power requirements of the prior art of rain sensors have impeded their deployment in remote locations.

There is an unmet need for an improved method and apparatus for automatically measuring precipitation.

SUMMARY OF THE INVENTION

The present invention collects precipitation such as rain in a bowl that is deployed with the opening of the bowl facing upward. A weighing device measures the weight of the combined bowl and water. A control circuit that includes a microprocessor utilizes the weight measurement to calculate the amount of water that has collected in the bowl, and provides an output representative of the amount of water that has accumulated. The bowl is connected to a vertical shaft of a motor, and at appropriate times, the control circuit spins the bowl. This spinning motion of the bowl exerts a centrifugal force on the water collected in the bowl, causing it to climb the sides of the bowl and be expelled. The present invention uses centrifugal force, and not the force of gravity, to empty the collecting device.

BRIEF DESCRIPTION OF THE DRAWINGS

A more complete understanding of the present invention may be derived by referring to the detailed description and claims when considered in connection with the figures. Like numerals may describe similar components in different views. Like numerals having different letter suffixes may represent different instances of similar components. The drawings illustrate generally, by way of example, but not by way of limitation, various embodiments discussed in the present document.

DESCRIPTION OF PREFERRED EMBODIMENTS

Figure 1:
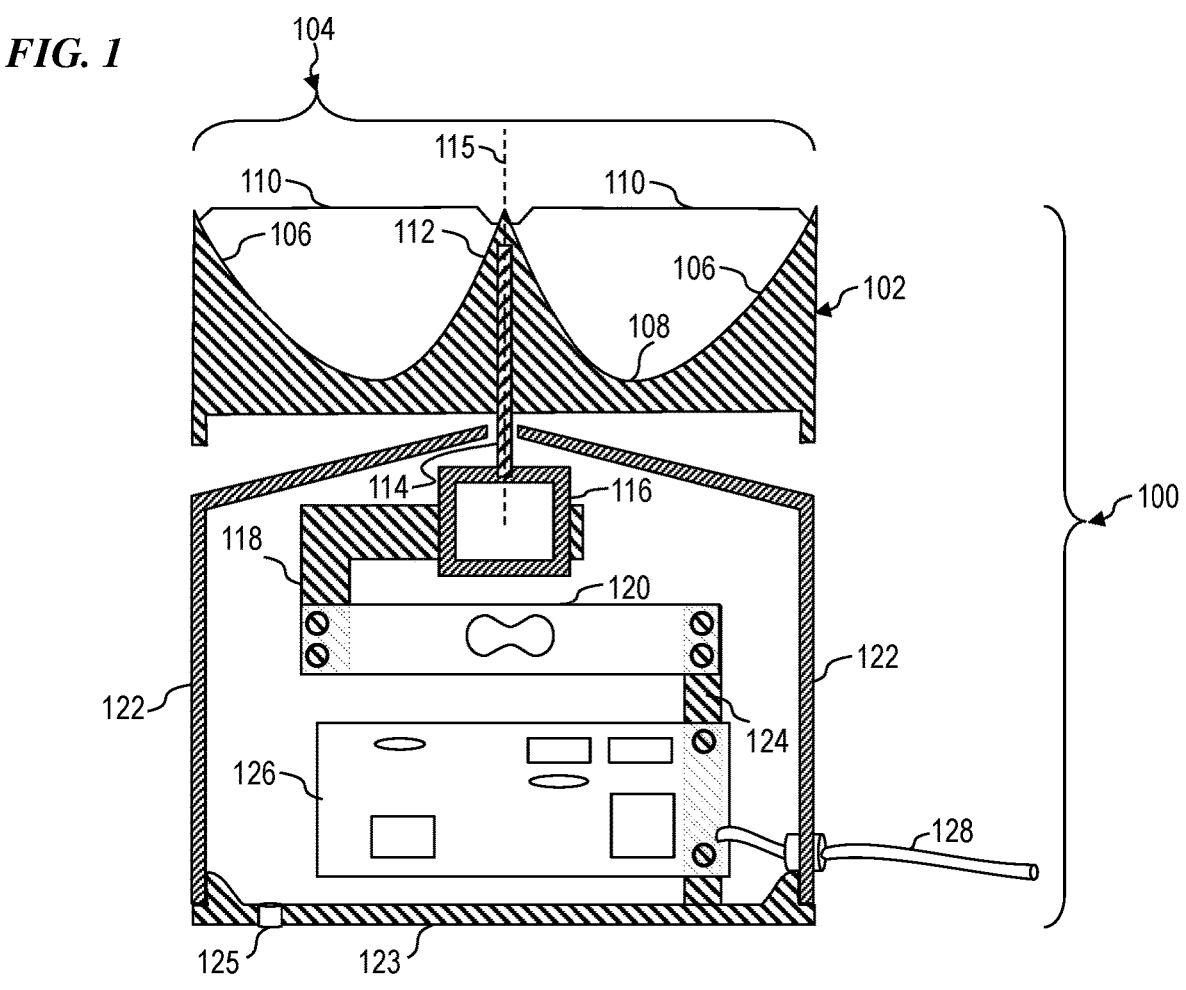
FIG. 1 is a sectional view of a spinning-bowl precipitation gauge 100 according to some embodiments of the invention.

| Reference Numerals in the Drawings | |
| --- | --- |
| 100 | Spinning-bowl precipitation gauge |
| 102 | Precipitation Collecting Bowl |
| 104 | Opening of the bowl |
| 106 | Sides of the bowl |
| 108 | Bottom of the bowl |
| 110 | Radial dividers |
| 112 | Center hub |
| 114 | Motor shaft |
| 115 | Axis of rotation |
| 116 | Motor |
| 118 | Motor mounting bracket |
| 120 | Weighing device (strain gauge load cell) |
| 122 | Housing |
| 123 | Housing bottom |
| 124 | Load cell Mounting Bracket |
| 125 | Leaked-Water Drain |
| 126 | Control Circuit |
| 128 | Interface |
| 202 | Gap |
| 300 | Microprocessor |
| 301 | Controller |
| 302 | Interface Circuit |
| 304 | Power supply |
| 306 | Serial Communication Means |
| 308 | Relay |
| 310 | Analog-to-Digital converter |
| 312 | Motor Driver |
| 314 | Temperature sensor |
| 316 | humidity sensor |
| 318 | Anemometer interface |
| 400 | Flow chart of software operation |
| 402 | START |
| 404 | SPIN |
| 406 | SET TARE |
| 408 | COMPENSATE |
| 410 | GET WEIGHT |
| 412 | OBJECT-DETECTED CHECK |
| 414 | ACCUMULATE |
| 416 | IS-IT-TIME-TO-SPIN CHECK |
| 418 | OUTER LOOP |
| 420 | MEASURE LOOP |
| 422 | OBJECT-DETECTION BRANCH |
| 500 | Raindrops |
| 502 | Collected Water |
| 504 | Leaf |
| 506 | Ejected Water |
| 508 | Clockwise direction-of-rotation arrow |
| 509 | Counterclockwise rotation arrow |
| 600 | Time-scale graphs of operation |
| 602 | Rate-of-Rainfall graph |
| 604 | Time of start of rainfall. |
| 606 | Constant rainfall rate. |
| 608 | Time that rainfall stops. |
| 610 | Weight collected versus time |
| 612A | Constant climb of weight (part 1) |
| 612B | Constant climb of weight (part 2) |
| 614 | Reported accumulation |
| 616 | Constantly increasing reported accumulation |
| 618 | Relay closures versus time |
| 620A, 620B | Individual relay closures |
| 622 | Time bowl is close to full |
| 624 | To-empty threshold |
| 626 | Constant measured weight |
| 628 | Constant reported accumulation |
| 630 | Graph of spins |
| 632 | Spin-to-clear-bowl event |
| 634 | Default spin event |
| 700 | Wind speed, weight error versus time |
| 702 | Wind Speed versus time |
| 704 | Time Wind starts |

-continued

| Reference Numerals in the Drawings | |
|---|---|
| 706 | Time scale of graph |
| 708 | Presented weight versus time |
| 800 | Anemometer |
| 801 | SBPG system |
| 802 | Anemometer connection |
| 804 | Weather vane |
| 806 | Weather-vane connection |
| 810 | Spinning-bowl precipitation gauge |
| 900 | Weight Collected |
| 902 | Time scale of graph |
| 904 | Time object lands |
| 906 | Object weight |
| 908 | Object threshold |
| 910 | Object-expelled time |
| 912 | Graph of motor spins due to object |
| 1000 | Temperature vs. error graphs |
| 1002 | Weight indicated by load cell. |
| 1004 | Time axis |
| 1006 | Time of start of increase in temperature |
| 1008 | End of increase in temperature |
| 1010 | Graph of temperature vs. time |
| 1100 | Spinning-bowl precipitation gauge |
| 1102 | Precipitation collecting bowl |
| 1104 | Opening of the bowl |
| 1106 | Sides of the bowl |
| 1107 | Water |
| 1108 | Bottom of the bowl |
| 1109 | Top surface of water |
| 1112 | Center hub |
| 1114 | Motor shaft |
| 1115 | Rotational axis |
| 1116 | Motor |
| 1117 | Motor mounting bracket |
| 1122 | Housing |
| 1126 | Control circuit |
| 1128 | External communications interface |
| 1130 | Optical signals |
| 1131 | Optical sensor measurement device |
| 1132 | Reflected optical signals |
| 1133 | Optical-sensor data signals |
| 1200 | Spinning-bowl precipitation gauge |
| 1202 | Metal precipitation collecting bowl |
| 1204 | Opening of the bowl |
| 1206 | Sides of the bowl |
| 1207 | Water |
| 1208 | Bottom of the bowl |
| 1210 | Electrical brush |
| 1211 | Electrical insulator |
| 1212 | Center hub |
| 1214 | Motor shaft |
| 1215 | Rotational axis |
| 1216 | Motor |
| 1217 | Motor-mounting bracket |
| 1222 | Housing |
| 1226 | Control circuit |
| 1228 | External interface |
| 1233 | Resistance data signals |
| 1241 | Resistance sensor |

It is an object of the invention to provide a precipitation sensor that is not subject to clogging, and is thus low maintenance.

Another object of the invention to provide a precipitation sensor upon which it would be difficult to impossible for a bird to build a nest.

A further object of the invention is to be able to measure snow, without the need for an energy-consuming heater.

A further object of the invention is to be able to accurately measure very high flow rates of rainfall.

Another object of some embodiments of the invention is to accurately measure rainfall based on a primary and immutable characteristic of water, namely its weight, rather than some secondary characteristic such as conductivity or optical properties. In some other embodiments, electrical conductivity or optical properties to measure the amounts of precipitation are used alternatively, or additionally, to weight measurements of precipitation.

The objects of the invention all seek to overcome the disadvantages of precipitation gauges according to the prior art, and thus to provide a precipitation sensor that remains free from clogs and accurately measures both small and large amounts of both rain and snow.

Other objects and advantages of the invention will be apparent from the specification and drawings.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

DESCRIPTION OF THE INVENTION

A typical embodiment of the invention, a spinning-bowl precipitation gauge 100, is shown in a sectional view in FIG. 1. The precipitation gauge 100 includes a precipitation-collecting bowl 102 disposed with the opening 104 of the bowl upward. The sides 106 of bowl 102 are sloped, and the bottom 108 of the bowl provides an area for water to collect. The sloped sides 106 preferably approximate a parabolic shape. In the preferred embodiment of the invention, the bowl further includes radial dividers 110 that divide bowl 102 into sections, much like a pie or pizza. The bowl is radially symmetric, and a center hub 112 protrudes above the bottom of the bowl.

Collecting bowl 102 is mounted to a shaft 114 of a motor 116, with shaft 114 being generally vertical. Motor 116 is preferably a gear-motor, such that the motor 116 may develop reasonable torque with a modest input current. Motor 116 is mounted to a motor mounting bracket 118 that connects it to a weighing device 120, which in the preferred embodiment is a strain-gauge-based load cell. Such load cells are mass produced for consumer items such as postal scales, and are thus inexpensive and readily available. The load cell 120 is connected to a housing bottom 123 of housing 122 by way of load cell mounting bracket 124. Also mounted to bracket 124 is a control circuit 126, conventionally implemented using a printed circuit board. Flexibles (conventional wirings not shown to avoid clutter) connect control circuit 126 to motor 116 and load cell 120. Housing 122 protects the motor 116, load cell 120, and circuit 126 from the elements. An interface cable 128 comprised of several wires connects the invention (spinning-bowl precipitation gauge 100) to external equipment (not shown). Leaked-water drain 125 drains any leaked water from housing 122.

Figure 2:
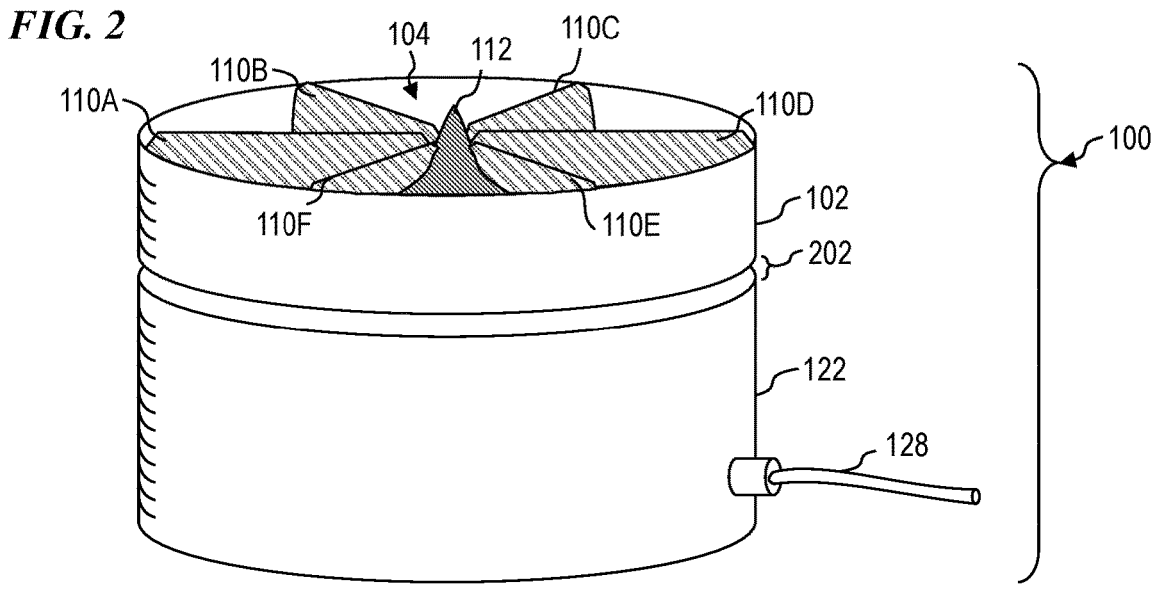
FIG. 2 presents a perspective view of spinning-bowl precipitation gauge 100 according to some embodiments of the invention.

A perspective view of the precipitation gauge presented in FIG. 2 further illustrates the configuration of bowl 102 with radial dividers 110 (e.g., in some embodiments, by six dividers labeled here as 110A, 110B, 110C, 110D, 110E and 110F). Thus configured, bowl 102 may spin freely above housing 122. It can be seen that a gap 202 between housing 122 and bowl 102 is kept small to minimize the effects of wind, which are discussed below.

Figure 3:
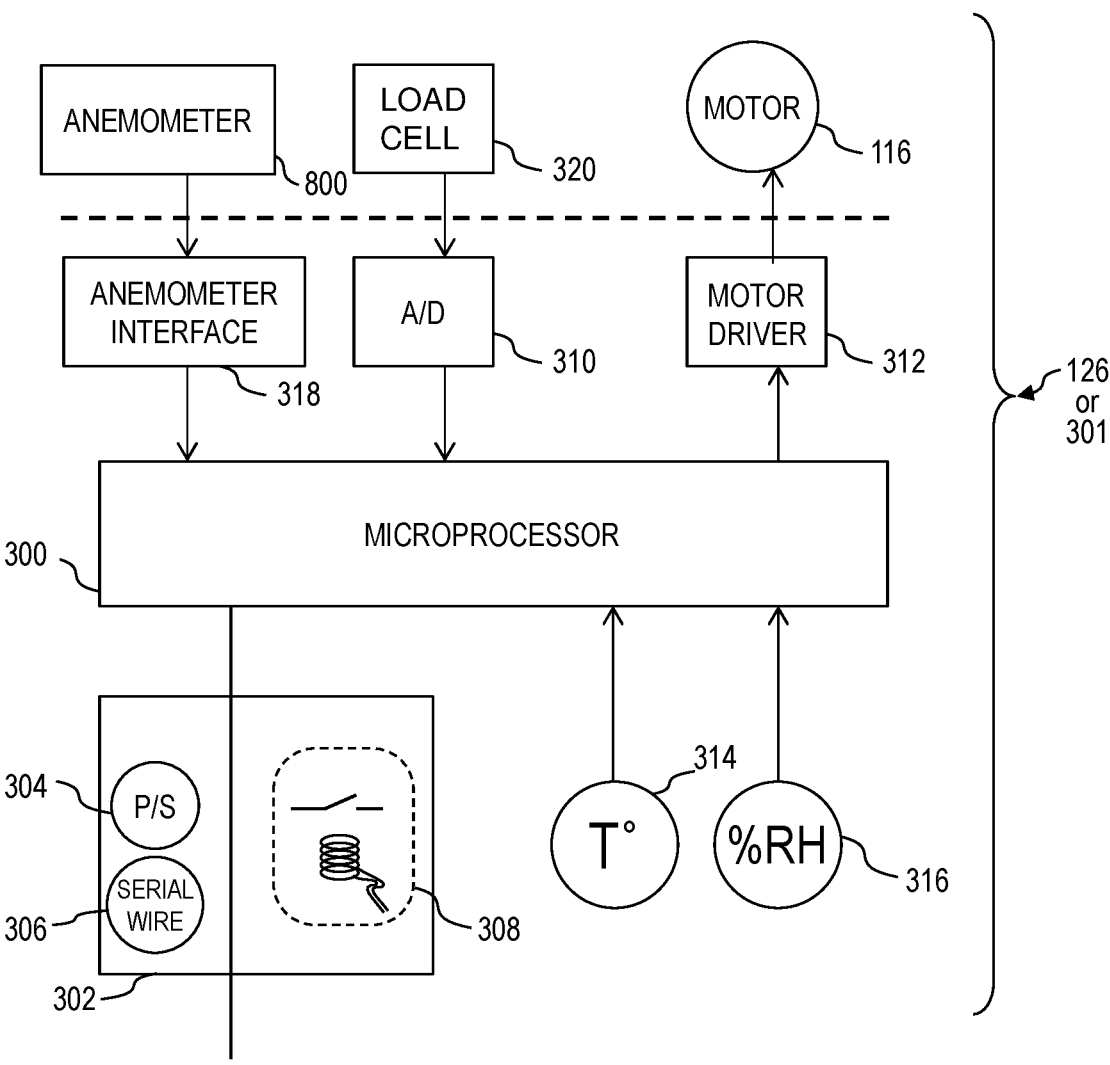
FIG. 3 is a block diagram of a circuit 301 that can be used for the control circuit 126 of FIG. 1.

A block diagram of control circuit 126 is presented in FIG. 3. Elements above the dashed line are not mounted on the circuit board. Control circuit 126 includes a microprocessor 300 to perform the control functions of the invention and report data to external equipment. Control circuit 126 further includes an interface circuit 302 for connection to the outside world, and that circuit in turn includes a power supply 304. The interface circuit includes serial communications means 306, such as a USB port, and a relay 308 that permits the invention to emulate a conventional tipping bucket. Microprocessor 300 is connected to load cell 120 via an analog-to-digital converter 310, such as the HX711 ADC by Avia Semiconductor, which is a device specifically intended to interface to load cells. Microprocessor 300 is also connected to a motor driver 312 that allows it to spin the motor 116 as directed.

Microprocessor 300 also optionally receives input from a temperature sensor 314 and humidity sensor 316, both conventionally mounted on the circuit board. The precipitation gauge is connected to external equipment via a number of connections that comprise interface 128 (see FIG. 2). In an alternative embodiment, the control circuit may also include an anemometer interface 318 (an interface to a wind-speed sensor, such as, for example, anemometer 800 shown in FIG. 8) that is discussed below. In an alternative embodiment, the precipitation gauge is connected to external equipment wirelessly, via radio-frequency (RF) signals (not shown).

Figure 4:
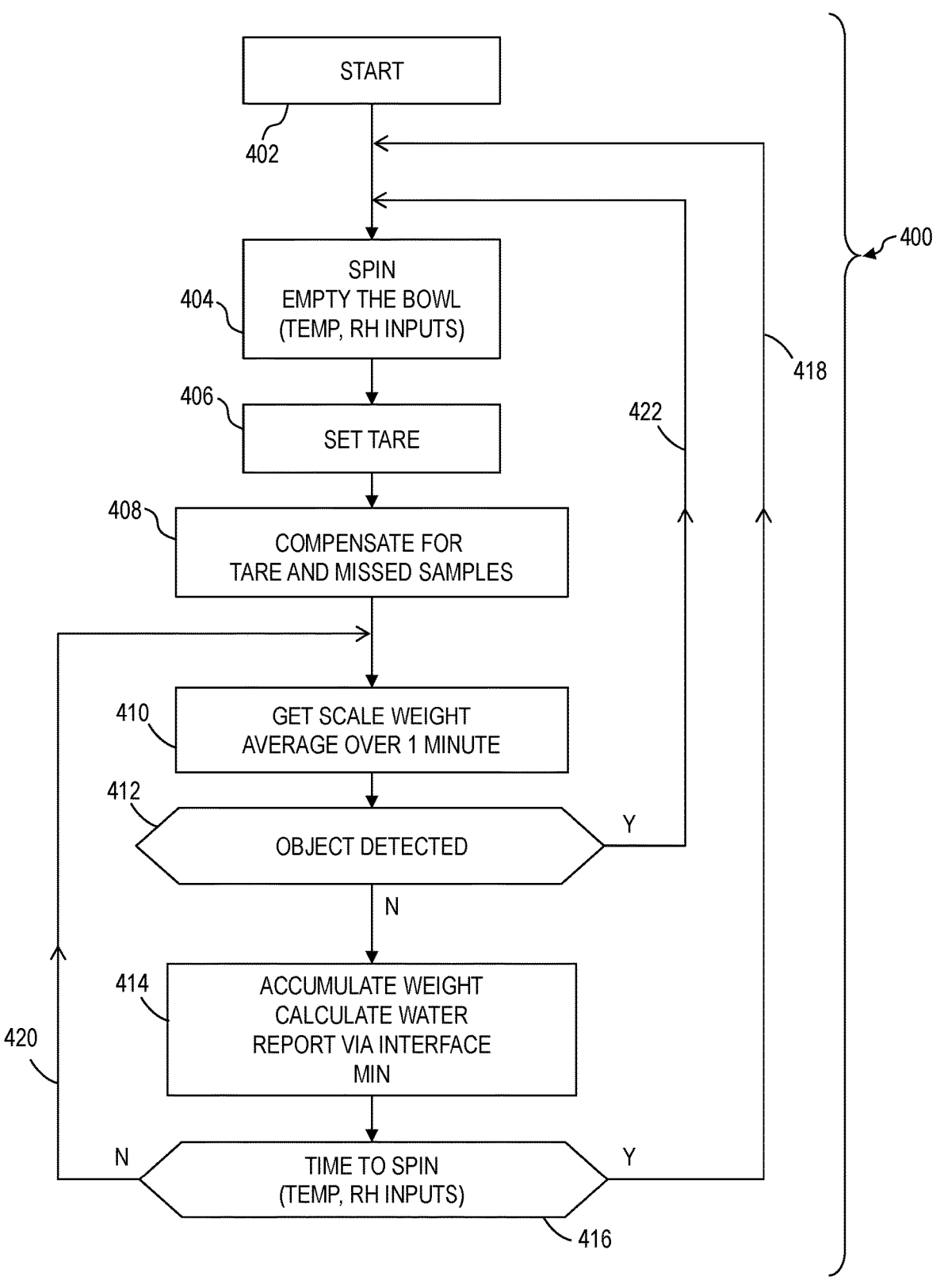
FIG. 4 is a flowchart 400 that depicts the operation of software of the invention in the form of a flowchart.

Software 400 to control the system is deployed within the microprocessor and is illustrated in FIG. 4. The software 400 generally includes a START or entry point 402, a provision for spinning and emptying 404 the bowl (SPIN 404), setting 406 the tare (SET TARE 406), and compensating for tare (COMPENSATE 408). Further, the software 400 includes provisions for weighing 410 the bowl 102, motor 116, water 502 and any debris 504 (see FIG. 5A), detecting 412 extraneous objects, accumulating 414 weight and performing calculations, and ascertaining 416 whether it is an appropriate time to spin the bowl (TIME TO SPIN 416). The interaction of the elements is described later, below.

Operation

Figure 5A:
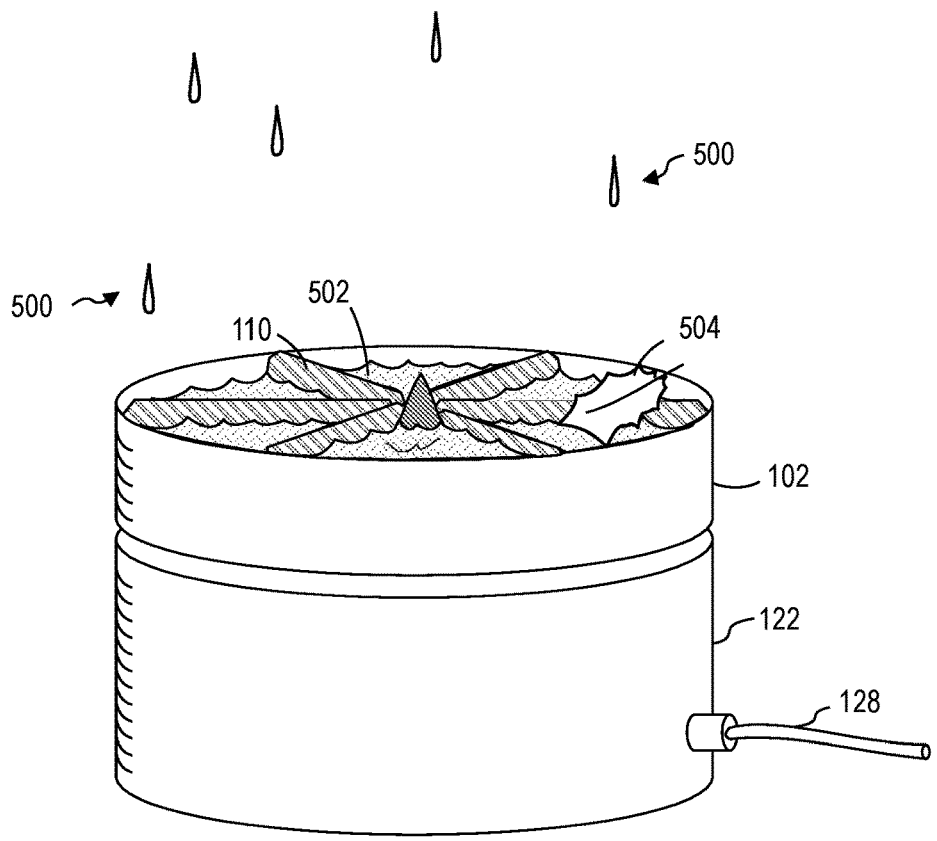
FIG. 5A and FIG. 5B are perspective views that illustrate the operation of spinning-bowl precipitation gauge 100 when the device collects rain and debris (FIG. 5A) and then, and FIG. 5B, spins to empty the rain and debris.
Figure 5B:
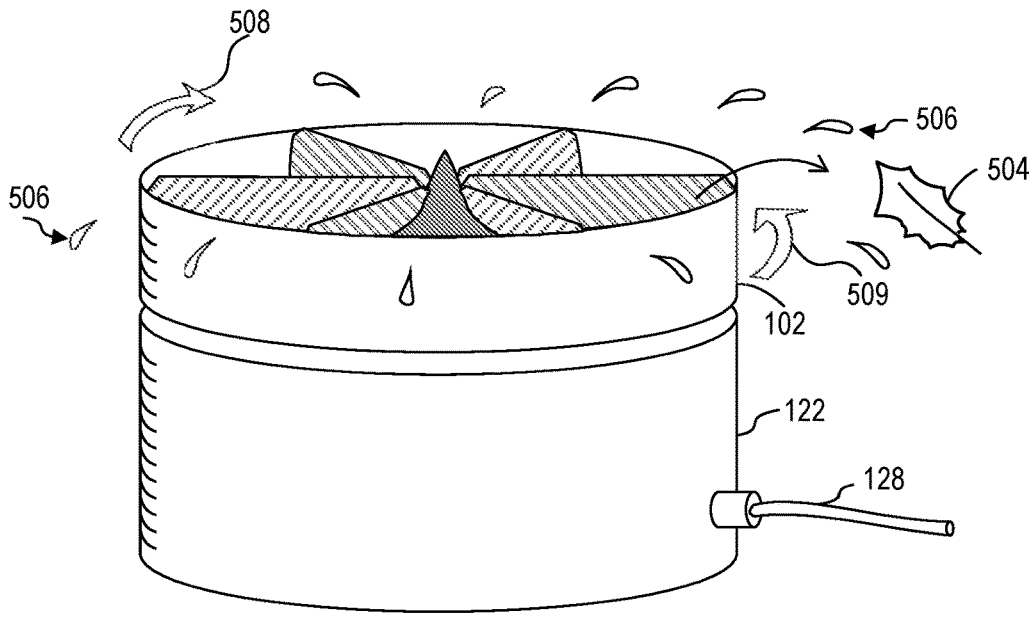

Operation of the present invention is illustrated in FIGS. 5A and 5B. Raindrops 500, or other forms of precipitation such as sleet, mist, or snow, fall into bowl 102 and flow toward the bottom. Collected water 502 gathers in the bowl. Weighing device 120 and control circuit 126 (see FIG. 1) within housing 122 measure the weight of the collected precipitation. Control circuit 126 computes the amount of water that must have fallen. Corresponding information is sent to external equipment via interface 128. FIG. 5A also depicts a leaf 504 that has extraneously fallen into bowl 102. This is the sort of debris that might clog a conventional tipping-bucket rain gauge.

At appropriate times, periodically and/or based on the weight of collected water 502 and/or debris in collection bowl 102, generally before the collection bowl fills completely, control circuit 126 causes collection bowl 102 to spin, as is depicted in FIG. 5B. The spinning motion of the bowl causes a centrifugal force to be exerted on anything placed in the bowl, including water. The resulting centrifugal force exerted on collected water 502 causes the water to climb up the sloped sides of the bowl and be ejected out the sides. Ejected water 506 is flung from the bowl. Any collected debris such as illustrated leaf 504 is ejected as well. Water is illustrated in the figure, but the operation of the device is similar for snow or ice. Arrow 508 shows the clockwise direction of rotation of bowl 102. The motor driver 312 of the control circuit 126/301 may alternatively be configured to spin the bowl 102 in either direction, clockwise (508) or counterclockwise (509), to further aid in expelling water. Dividers 110 prevent snow from forming a single solid mass, which otherwise might not be ejected when the bowl spins. Collection bowl 102 is smooth to facilitate easy ejection of snow and ice. Bowl 102 may optionally be coated with a non-stick material.

In greater detail, referring again to FIG. 1 collection bowl 102 collects all water that is subtended vertically by the circular opening 104. Sides 106 of bowl 102 are angled such that any splashing of raindrops will be generally into and not out of the bowl 102. The small amount that may collect on dividers 110 and center hub 112 will similarly tend to fall toward the bottom 108. The sides of center hub 112 are also sloped to cause the water to not collect near the very center, where centrifugal forces affect it least, but instead to collect around a bottom 108 that is a distance from the axis of rotation 115. If the water is falling in the form of ice or snow, or if that water subsequently freezes, dividers 110 prevent the solidified water from forming a contiguous ring that would be hard to eject. The speed of the bowl has been experimentally found to be sufficiently vigorous at about 600 revolutions per minute (RPM) for rain, and 900 RPM for snow.

The weight of collected water 502 is transferred to the bottom of collection bowl 102 and onto the shaft 114 of motor 116. The weight is further transferred through motor 116 and mounting bracket 118 onto weighing device 120, which is preferably implemented in the form of a load cell. A load cell is generally designed to be sensitive only to forces along one axis, in this case in the vertical direction. Load cell 120 is conventionally connected to the control circuit 126 with flexible wires (not shown) that do not inhibit operation of the cell. Within control circuit 126, analog-to-digital converter 310 receives signals from the load cell and presents them to microprocessor 300 (shown in FIG. 3).

The weight of the water is directly proportional to the amount of water collected 502. If collecting bowl 102 is circular and 12.7 cm (5") in diameter at the top collection area 104, every mm (0.394") of precipitation water collected at the top collection area 104 by collecting bowl 102 will weigh 12.67 grams. Alternatively and equivalently, every 0.01 inch of water (0.255 mm) will weigh 3.22 grams. The software of the present invention uses this information to compute the amount of water that has been collected. Microprocessor 300 communicates to external equipment how much precipitation, in the form of an equivalent amount of water, is collected. Such communication can be in the form of a serial data stream, or in the form of a relay closure that emulates the output of a conventional tipping-bucket rain gauge.

Conventional prior-art tipping-bucket rain gauges are typically deployed such that they close a switch for a few tens of milliseconds each time the bucket tips. This switch closure proves a tip output, and typically occurs at every 0.2 mm or every 0.01 inch of accumulation, as this makes for an appropriate size of bucket. In some embodiments, the present invention similarly produces a relay closure of a few tens of milliseconds upon each 0.2 mm or 0.01 inch of accumulation. Thus, the present invention may typically replace a conventional tipping bucket with little or no redesign of the system in which it is deployed.

Software and Further Details of Operation

Further details of operation of the invention are illustrated as a flow-chart in FIG. 4. Operation of the invention commences upon START 402 and continues indefinitely. The operation generally consists of an outer loop 418 and an inner loop 420. The outer loop 418 paces the spinning of the bowl 102—and thus ejection of water 502 and debris 504—while the inner loop 420 paces the measurements.

After START 402, the software 400 executes step SPIN 404 prompting microprocessor 300 to activate motor driver 312. Motor driver 312 in turn spins motor 116. The attached bowl 102 spins, thus ejecting water 502 and debris 504.

With bowl 102 thus cleared, the software 400 executes step TARE 406, setting a zero-weight reference for load cell 120. During the setting of the tare, the device is not responding to new rain falling. Thus step COMPENSATE 408 estimates how much precipitation the device missed over the duration of the tare setting sequence. This calculation is added to subsequent accumulation calculations described below.

From there, the software 400 proceeds to inner loop 420, the first step of which is to measure the weight over the course of a sample interval. In a preferred embodiment of the invention, twenty-four hundred (2,400) measurements are taken over the course of a minute. These values are averaged to reduce the effects of electrical noise within the load cell 120 and mitigate the effects of wind.

After completing the measurements of the sample interval, the software 400 executes the step OBJECT DETECT 412. This step determines if a large weight has suddenly appeared in the water-collecting bowl 102 such as would be too large to plausibly be rainfall accumulation. The presence of such weight indicates the likely presence of a bird or other foreign object. In this case, control of the software 400 passes back to step SPIN 404 via branch 422, ejecting the object.

In normal operation, absent a detected object, control passes to step ACCUMULATE 414. This step totalizes the amount of weight measured by the load cell 120 and calculates the equivalent amount of water, which information is communicated to external equipment via the interface 128. This step also includes controlling the relay that allows the invention to emulate a conventional tipping bucket.

The step TIME TO SPIN 416 determines if the weight of the collected water exceeds a threshold. This threshold is set to prevent the precipitation bowl 102 from overflowing. If the threshold is met, the software 400 passes control of the device back up to step SPIN 404, spinning the bowl 102 and ejecting the water 502. Additionally, TIME TO SPIN 416 performs a "default spin" periodically to eject fallen leaves and other debris 504, regardless of precipitation. The default also prevents the formation of ice on bowl 102, in the presence of fluctuating ambient temperature.

Operation of the Device: Graphs

Figure 6:
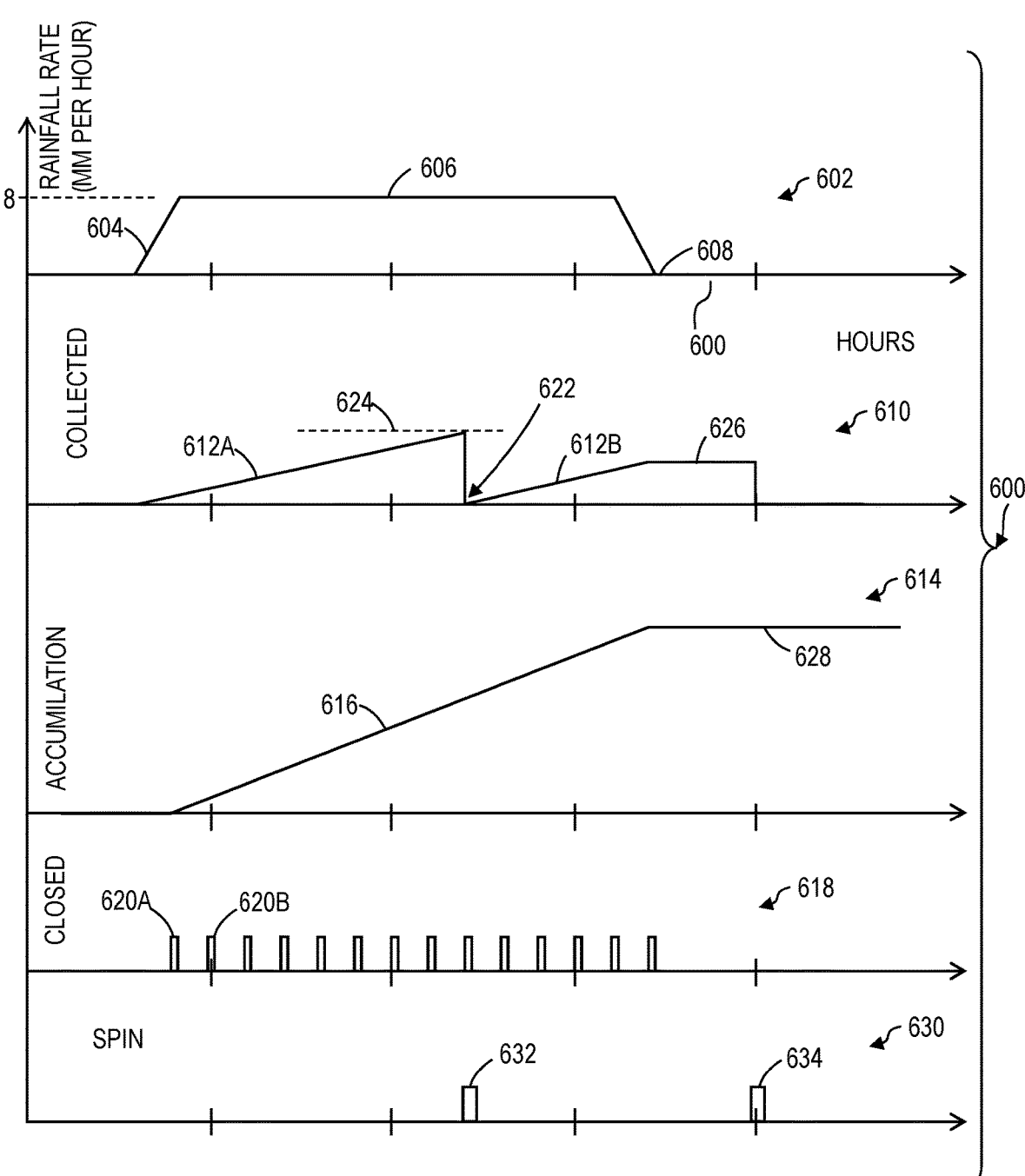
FIG. 6 is a multi-part graph 600 depicting various aspects of normal operation of spinning-bowl precipitation gauge 100 according to some embodiments of the invention.

Normal operation of the invention is depicted in a set of graphs shown in FIG. 6. The graphs use a common time scale 600 of a bit over four hours to represent a typical rain event.

The first graph depicts a rate of rainfall falling 602 on the invention during a typical rain event. Rain starts at a time 604. For demonstration purposes, the rainfall intensity or rate is shown to increase at a constant rate, hold level at 8 mm of additional rain accumulation per hour for a period of time 606, and decrease at a constant rate until stopping at time 608. In practice, rainfall intensity fluctuates.

The second graph depicts the weight of the water collected 610 in bowl 102. As rainfall 602 is constant, the weight accumulates at a constant rate 612A. This may be understood as the integration of a constant, which is a line.

The third graph shows the accumulation reported 614 by the precipitation gauge. That is, this graph shows what would be reported over interface 128. As rainfall 602 is constant, the reported accumulation also increases at a constant rate 616. The weighing and computations of this reporting are performed by the software presented earlier in FIG. 4.

Next, the fourth graph shows closures 618 of the relay 308 included in interface circuit 302. At every additional 0.2 mm of accumulation (or 0.01 inch if configured for U.S. Customary) the relay provides closures 620A, 620B, and so on. External equipment interprets this as being the equivalent of a bucket tip of a tipping bucket style rain gauge.

Returning to weight-collected graph 610 at time 622, enough water has accumulated in bowl 102 that it is reasonably full—for instance 1 cm (0.4")—but not overflowing. At this time 622, the weight accumulated 610 exceeds a to-empty threshold 624. The software step TIME TO SPIN 416 interprets this condition as being that it is indeed time to spin, and the step SPIN 404 is executed. Motor 116 spins bowl 102, ejecting the water and reducing the weight collected 610 to zero. This is shown in the graph of spins 630 as spin-to-clear-bowl-event 632. The reported accumulation continues its rise 616 unimpeded. Any new rainwater not measured during the time of the spin is compensated for by the step COMPENSATE 408 through a process of interpolation. After time 622, the accumulated weight resumes its constant rise 612B.

A bit later at time 608, rainfall stops, and rate 602 drops to zero. Thereafter accumulated weight 610 assumes a constant level 626, and reported accumulation 614 remains at a constant level 628. The detection of this constant level 628 causes relay closures 618 to cease. At a later time 634, the software determines that it is time for a default spin. This causes the software controlling the spinning of bowl 102 to execute a spin. The weight 610 measurement of water in the bowl 102 drops to zero, as the water has been cleared from bowl 102. Reported accumulation 614 is unaffected.

While FIG. 6 and the above description detail operation during a regular rainfall, it may be appreciated that the present invention may also detect snow, freezing rain, or a heavy mist. If the ambient temperature surrounding the rain gauge is near freezing or below, the TIME TO SPIN 416 detection uses a lower to-empty threshold 624 to determine when to clear the bowl. Further, temperature sensor 314 and humidity sensor 316 may be used in conjunction with load cell 120 to make an accurate estimate of the height of the snow collected. This is a function of temperature, humidity, and amount of water, data for which is all present in the device.

Practical Considerations: Wind

Figure 7:
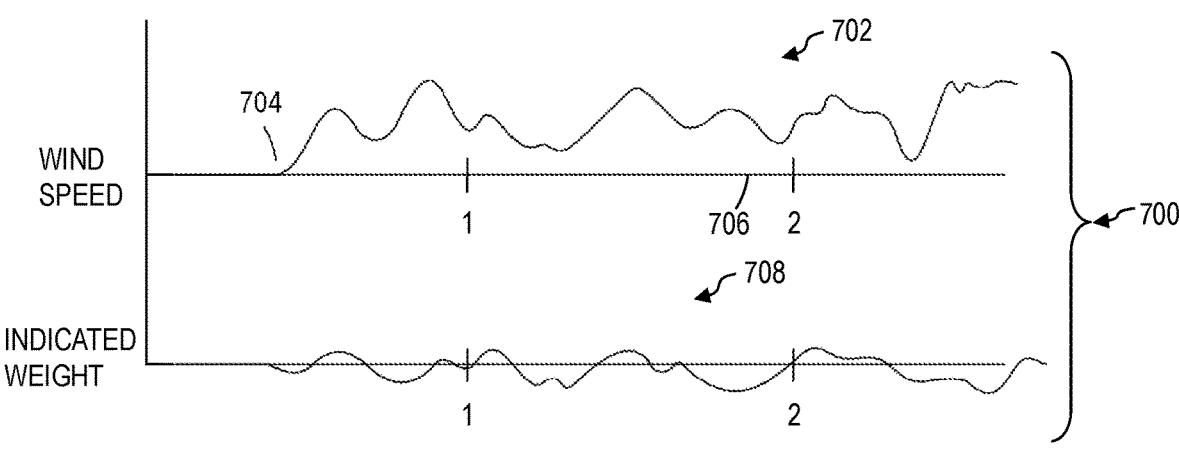
FIG. 7 presents a pair of graphs showing the effects of wind on the precipitation gauge 100.

The weight measured by load cell 120 is affected by external forces. The invention is deployed outdoors, and thus wind blows against it. Wind blows against the bowl 102, and a modest wind (say 16 km/h or 10 MPH) can cause a fluctuation of force on bowl 102 equivalent to the weight of several grams. This would be the equivalent force of a fraction of a millimeter (several hundredths of an inch) of water and could yield a false positive indication of rain or an under-reporting. FIG. 7 presents a pair of graphs that show the effect of wind on the device. The first graph shows the wind speed 702 that the precipitation gauge is subject to, which is, by nature, a positive number. For illustration, the wind starts at time 704 and then fluctuates naturally. The graph indicates a fluctuation and a fairly strong wind of about 16 km/hr (10 MPH) peak. The time scale 706 of the graph is a bit over two minutes; it is much shorter than that depicted in the operational graphs of FIG. 6. The nature of wind is that it buffets and changes constantly. Thus, wind speed represents a large, low-frequency noise component that must be accounted for.

FIG. 7 also presents a graph of the effective (or indicated) force or weight 708 presented to the load cell 102. This also has undulations and fluctuations, but this time in both the positive and negative directions. Under typical wind conditions, positive and negative fluctuations are about equal. To get rid of the effect of the noise, the invention averages a large number of samples over a relatively long time. Specifically, the invention preferably takes 2400 samples over the course of a minute and averages them, thus compensating for the effects of wind.

Figure 8:
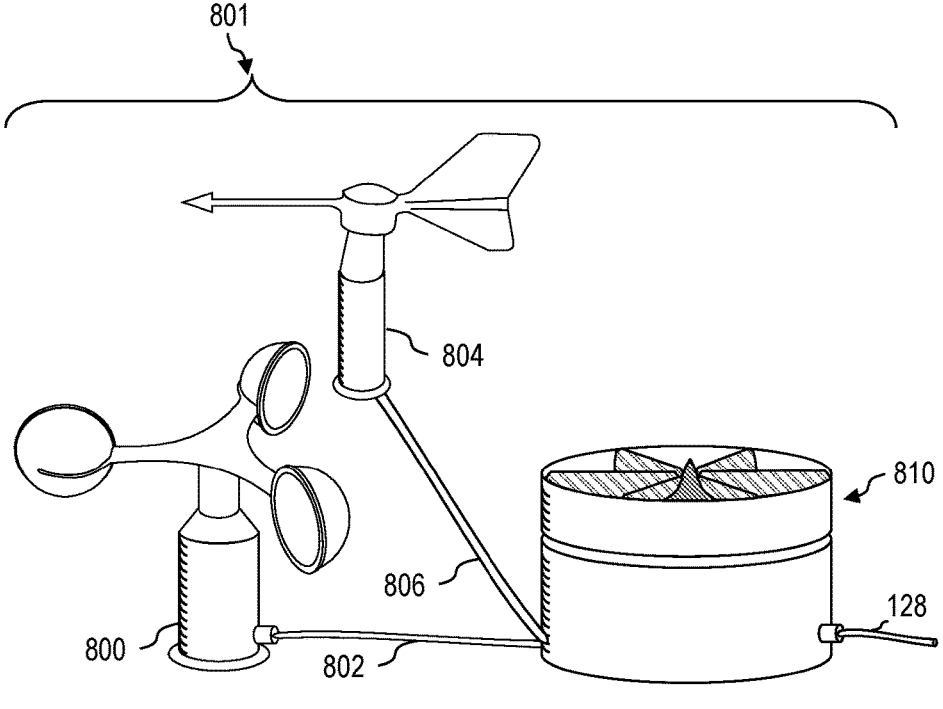
FIG. 8 is a perspective view that shows an embodiment of a spinning-bowl precipitation gauge 801, according to some embodiments of the invention, that includes an anemometer 800.

FIG. 8 is a perspective view that shows an embodiment of a spinning-bowl precipitation gauge (SBPG) system 801, according to some embodiments of the invention, that includes an anemometer 800 and a weather vane sensor 804 (also called a wind-direction sensor). The anemometer 800 includes a conventional connection 802 to the spinning-bowl precipitation gauge 810. The weather vane sensor 804 includes a conventional connection 806 to the spinning-bowl precipitation gauge 810. In some embodiments, precipitation-measurement readings are calibrated by compensating for wind measurements from anemometer 800.

Mechanical measures may also reduce the effects of wind. The gap 202 between housing 122 and bowl 102 is small (see FIG. 2), so that the underside of the bowl is not exposed. It is contemplated that the housing 122 may be configured so as to slightly shield the bowl 102. Wind shields may be deployed at some distance for the device for further accuracy enhancement, as are frequently deployed around conventional tipping buckets.

For extremely high wind conditions, there can be a slight bias of the force on the bowl 102 caused by wind. That is, the indicated force 702 has an average value that is slightly lower than zero. In a prototype embodiment of the invention, this has been found to be the equivalent force of about one (1) gram per 16 km/h (10 MPH) of wind. For this reason, an embodiment of the invention includes an anemometer 800 (FIG. 8) to measure wind speed, and optionally, wind direction. The effects of wind are compensated by linearly subtracting the effects of the wind from the weight measurement. The effect of wind can also be estimated by the degree of low-frequency noise present in the fluctuating measured weight. The particulars of low-frequency wind noise will depend on the aerodynamics of the bowl 102, housing 122, and surrounding structure in which the precipitation gauge is deployed.

While the invention utilizes the above step to mitigate the effect of wind, fortunately the effects of wind error do not accumulate. A false indication of water can be as much as about a millimeter (0.04") but this indicated amount will go away once the wind dies down. The errors do not accumulate. The long-term accuracy of the precipitation gauge is thus largely unimpeded by wind.

Practical Considerations: Foreign Objects

Figure 9:
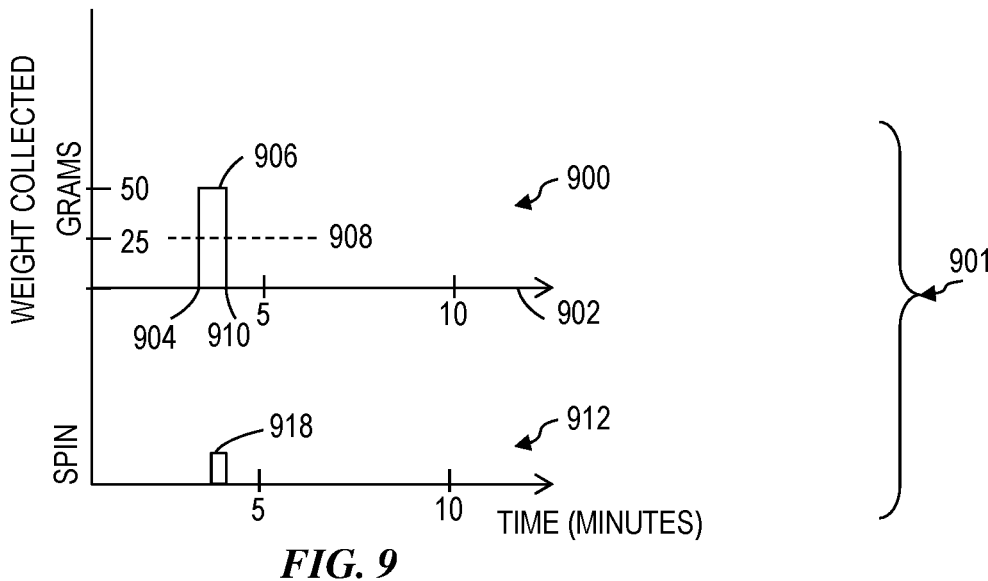
FIG. 9 presents a set of graphs 901 illustrating the object-detection function of the invention.

In normal operation, just a few grams of water accumulate for each one-minute sample. If a bird should happen to land upon the rain-collection bowl 102, it will make for a sudden large increase in measured weight detected by the load cell 120. A typical backyard bird weighs on the order of 50 grams. This situation is illustrated in FIG. 9, where graph 900 depicts the force upon load cell 120. The time scale 902 of the graph is ten minutes. At time 904 an object, such a small bird, lands upon the collecting bowl 102. This causes an immediate rise to level 906 in the weight detected by the load cell 120 of an object weighing 50 grams. The step OBJECT DETECTED 412, shown in FIG. 4, determines that this increase exceeds an Object Threshold 908 of 25 grams. This weight would correspond to a rainfall rate of over 10 mm (4 inches) per hour, which is unrealistically high. Thus, OBJECT DETECTED 412 passes control of the device to step SPIN 404 which empties the bowl 102 at a time Object Expelled 910. The object-detection motor spins 918 are portrayed in graph 912 of FIG. 9.

The spinning motion of collecting bowl 102 expels the bird. The bird will fly away unharmed, but the experience will likely be memorable for the bird and discourage further interference with the rain gauge. Should an obstinate bird attempt to place twigs upon the collection bowl 102 in an attempt to build a nest, such twigs will be quickly expelled either by the object-detection spin 422 (FIG. 4)/object-detection spin 918 (FIG. 9) or the default spin 418 (FIG. 4)/default spin 634 (FIG. 6). Typical application of the rain gauge is with a clear field above it, so it may accurately measure precipitation. As such the most common source of interference will typically be birds. If any foreign object, such as a branch or an ambitious climbing squirrel should happen upon the collecting bowl 102, it will also be expelled. Foreign objects too small to trigger the algorithm to expel will simply be thrown off during the next default spin.

Tare Drift

Figure 10:
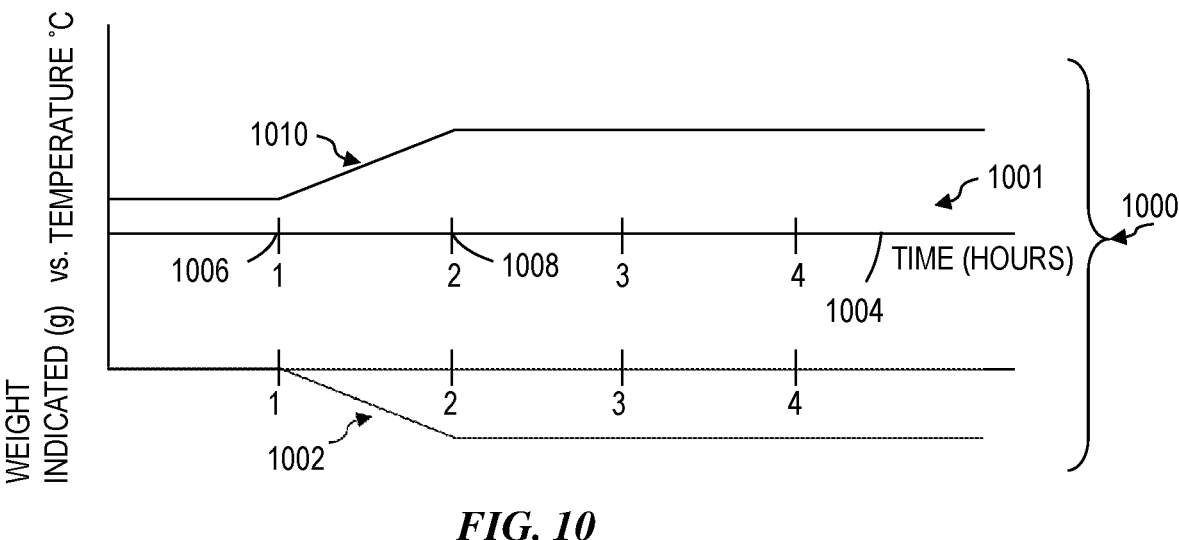
FIG. 10 presents graphs of weight indicated versus temperature, wherein the weight-indicated error is called "tare drift" that is for use to better calibrate weight data.

The tare of a weighing device, such as a scale or load cell, is the weight of the container or platform when empty. In this context, "tare" means the zero-setting of the load cell. That is, when the collecting bowl 102 is empty, the load cell 120 should read the weight of the collecting bowl 102 as zero. The zero setting of the load cell 120 is described above as step SET TARE 404 of FIG. 4. If the reading of the load cell 120 with nothing in bowl 102 should drift, that would be a source of error. The rain gauge 100 is deployed outdoors, where wide variations in temperature are common. Load cells are affected by such temperature variations. The output of the load cell 120 will swing by several grams over the course of normal temperature variations in a day, and this is "tare drift." If left unaccounted for, this would cause the rain gauge to indicate a small amount of accumulated rain. The effect of tare drift is presented in FIG. 10. The upper graph 1000 shows the temperature surrounding the invention, and the lower graph 1002 shows the weight indicated by load cell 120. The time axis 1004 of the graph shows time in hours. Starting at a time 1006 (1 hour into the graph) the temperature increases from 20 degrees Celsius, climbing to 30 degrees an hour later at time 1008 (2 hours) before stabilizing. The 10-degree increase in temperature causes the indicated weight to deviate by −1 gram. A prototype of the invention showed a reasonably consistent negative 1 gram of tare drift per 10 degrees of temperature.

The tare drift, while significant, is slow compared to real rain accumulation. The present invention detects when the rate of change of output is below a tare-drift threshold. Should the rate of change of output fall below this threshold, the data is ignored, and the rain gauge collects the next sample. A reasonable value of tare-drift threshold is that corresponding to 0.0025 mm (0.0001") of rain per minute. That is, rates of accumulation that low are very rare, and practical deployments of the rain gauge are unconcerned about such rates. The rejection of tare is accomplished in the step ACCUMULATE 414 of FIG. 4. Further, in some embodiments, temperature sensor 314 of the device is used to provide a first-order compensation of tare drift. The scale of the load cell 120 may also drift with temperature, and, in some embodiments, the invention also compensates for this.

Further Alternative Embodiments and Details of Implementation

In some embodiments, the control of motor 116 is best achieved with a pulse-width modulation, or PWM controller. With such a scheme, the motor 116 is accelerated up to speed and decelerated after the bowl is cleared. These steps make for less surge current in the motor and thus extend its life. Further, a lower speed is required for liquid rain than is for ice and snow. The present invention has been found to be best implemented using a conventional gearmotor. Alternatively, a motor without gears or with sufficient low-speed torque may be used. A stepper motor may be used although conventional stepper motors struggle to achieve the required speed. In some embodiments, the motor 116 is a convention brush-type, brushless, induction, or piezoelectric motor. In some embodiments, motor 116 is a motor such as described in U.S. Pat. No. 4,549,104, which issued on Oct. 22, 1985 to Niimura et al. with the title "MOTOR OF THE PERMA-NENT-MAGNET ROTOR TYPE," U.S. Pat. No. 10,848,025, which issued on Nov. 24, 2020 to Zhao et al with the title "PERMANENT MAGNET BRUSHLESS MOTOR HAVING HIGH WINDING FACTOR, AND DESIGN AND FAULT-TOLERANT CONTROL METHODS THEREOF," or U.S. Pat. No. 6,051,943, which issued on Apr. 18, 2000 to Rabin et al. with the title "SERVO MOTOR CONTROL-LER USING POSITION INTERPOLATION," each of which is incorporated herein by reference. In some embodiments, motor 116 is self-contained, while in other embodiments, magnets are integrated into the bowl 102. While an electric motor is the most conveniently implemented embodiment, other embodiments may use a pneumatic, hydraulic, or spring-wound motor to accomplish the required spinning and resulting centrifugal force.

The speed of motor 116 may be adjusted with temperature and relative humidity, so it is spun faster when it is cold and snow is likely to be present. This is referenced in the FIG. 4 step SPIN 404 as "TEMP, RH INPUTS." This feature allows the bowl 102 to be spun with no more speed than necessary, thereby conserving power. The motor driver 312 of the control circuit 126/301 may alternatively be configured to spin the bowl 102 in either direction, clockwise or counterclockwise, to further aid in expelling water.

Collecting bowl 102 optimally has sloped sides that make it easy for rain or snow to climb up the sides to be ejected in the presence of centrifugal force. This is depicted in the sectional view of FIG. 1. It has been discussed that the collecting bowl 102 preferably includes dividers 110 to prevent the formation of a solid ring of snow or ice, and to further expedite the expelling of water. In practice the present invention sets the thresholds for emptying the bowl 102 such that snow does not pile up over the dividers 110. Still, some precipitation may splash out of the collection bowl 102. This is compensated for in step ACCUMULA-TION 414. Such compensation is modest as a prototype of the invention has shown that the basic physics yield accurate results. A prototype of the invention yielded results that were just 3% lower than those provided by a reference tipping bucket over a seven-hour rain event. After a corresponding 3% compensation factor is added, it is expected that the present invention is within the measurement accuracies of reference tipping buckets. This compensation factor may be adjusted with rainfall rates, thus permitting the device to accurately report at very high rates of rainfall.

A prototype of the present precipitation gauge has been shown to be within the measurement accuracy of conventional tipping buckets. Additionally, and unlike conventional tipping buckets, the present invention can measure less than a bucket full of accumulation, which is usually 0.2 mm or 0.01". Further, the present invention indicates such amounts effectively immediately, and not after the delay of several tips worth of accumulation that is typical with conventional tipping buckets.

Most of the time the invention does not need to consume much power. The microprocessor can be in "sleep" mode most of the time and consume under a milliamp. Measuring weight with a load-cell is also not a power-hungry operation. The only operation that consumes significant power is the spinning of the bowl 102, but this is infrequent. Thus, the invention is well-suited to remote deployments and solar power.

The present invention is primarily aimed at measuring rain as the measurement of rain comprises the majority of applications. Precipitation is always in the form of water, even if impurities are present. The precipitation-collection bowl 102 may be thought of as a water collecting device. Rain measurement is by its nature a volume divided by an area and thus a linear accumulation. Tipping buckets are typically calibrated so as to give one tip at 0.2 mm or 0.01", as is the present invention's spin cycle, in some embodiments. Tipping buckets typically provide a contact closure for a few tens of milliseconds per tip. Temperature sensor 314 and step ACCUMULATE 414 of the present invention may alternatively report millimeters or inches of snow-accumulation depth based on recorded water accumulation. Configuration for the desired units (metric or U.S. Customary) may be set by the user via interface 128.

As noted above, the device 801 is somewhat enhanced by the inclusion of an anemometer 800, a temperature sensor 314, and a humidity sensor 316. These sensors are not needed, however, in the most basic embodiments of the invention. While strain-gauge load-cells are preferred because of their accuracy and low cost, other types of weighing devices may be substituted in other embodiments. Other principles used in weighing devices include capacitive, vibrating wire, tuning fork, optical, electromagnetic force, spring-based, and others.

Through the combination of the features described herein, it may be appreciated that the present invention meets all of the objectives set for it. It is anticipated that the present invention will be of great utility in remote deployments, where the conventional art of tipping buckets leads to required maintenance or to inaccuracies. It is expected that the ability of the present spinning-bucket invention to measure a wide range of precipitation will be of great utility in the fields of avalanche prediction and erosion control, where the maintenance required of conventional tipping buckets has been a limiting factor.

Additional Variations

In some embodiments, rather than being vertical, dividers 110 may be optionally oriented at a slant from vertical, sloped in a direction away from the direction of spin shown by arrow 508 of FIG. 5B in order to urge the collected precipitation upward and outward during the initial acceleration.

In some embodiments, the direction of spin is alternated between clockwise and counterclockwise, in order to eject accumulated debris or frozen precipitation.

Figure 11:
FIG. 11 is a sectional view of a spinning-bowl precipitation gauge 1100, wherein the amount of water in bowl 1102 is measured optically rather than by weight, according to some embodiments of the invention.
Figure 11:
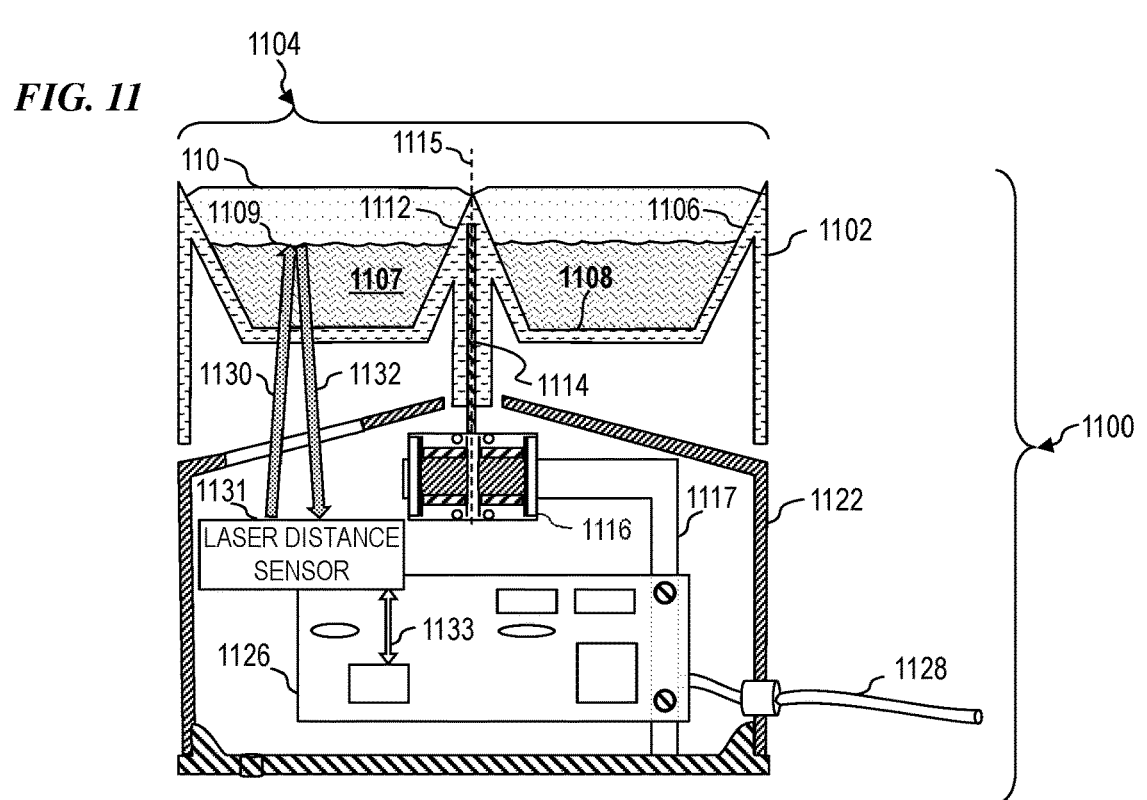

The invention may also be implemented using alternative technologies to measure the amount of precipitation in the precipitation-collecting bowl. One such variation is presented in FIG. 11, which uses an optical measurement technique. In this embodiment, a spinning bowl precipitation gauge 1100 uses a precipitation collecting bowl 1102 that is made of a clear plastic polymer, such as acrylic. A laser distance measuring device 1131 is deployed beneath the bowl, producing a vertical pulsatile beam 1130 that goes through bowl 1102 and strikes the top surface 1109 of any water 1107 collected in bowl 1102. Because the difference of index-of-refraction between water and air, a portion 1132 of beam 1130 is reflected back. Laser distance measuring device 1131 uses the round-trip time of the beam to calculate the distance to the top of the water. An electronic controller 1126 in turn uses data 1133 representing that distance to calculate the amount of water in the bowl. A motor 1116 is deployed to be able to spin bowl 1102, and connected to a housing 1122 via a fixed bracket 1117. As in other embodiments, controller 1126 controls the timing of the operation that spins the bowl around rotational axis 1115 when the amount of water collected reaches a threshold. In some embodiments, bowl 1102 includes a sloped inner surface 1112, a flat bottom surface 1108 and a sloped outer surface 1106 and radial divider walls 110 to help expel water when motor 1116 spins bowl 1102. In some embodiments, communications cable 1128 goes through housing 1122 and communicates measurement data to external equipment.

Figure 12:
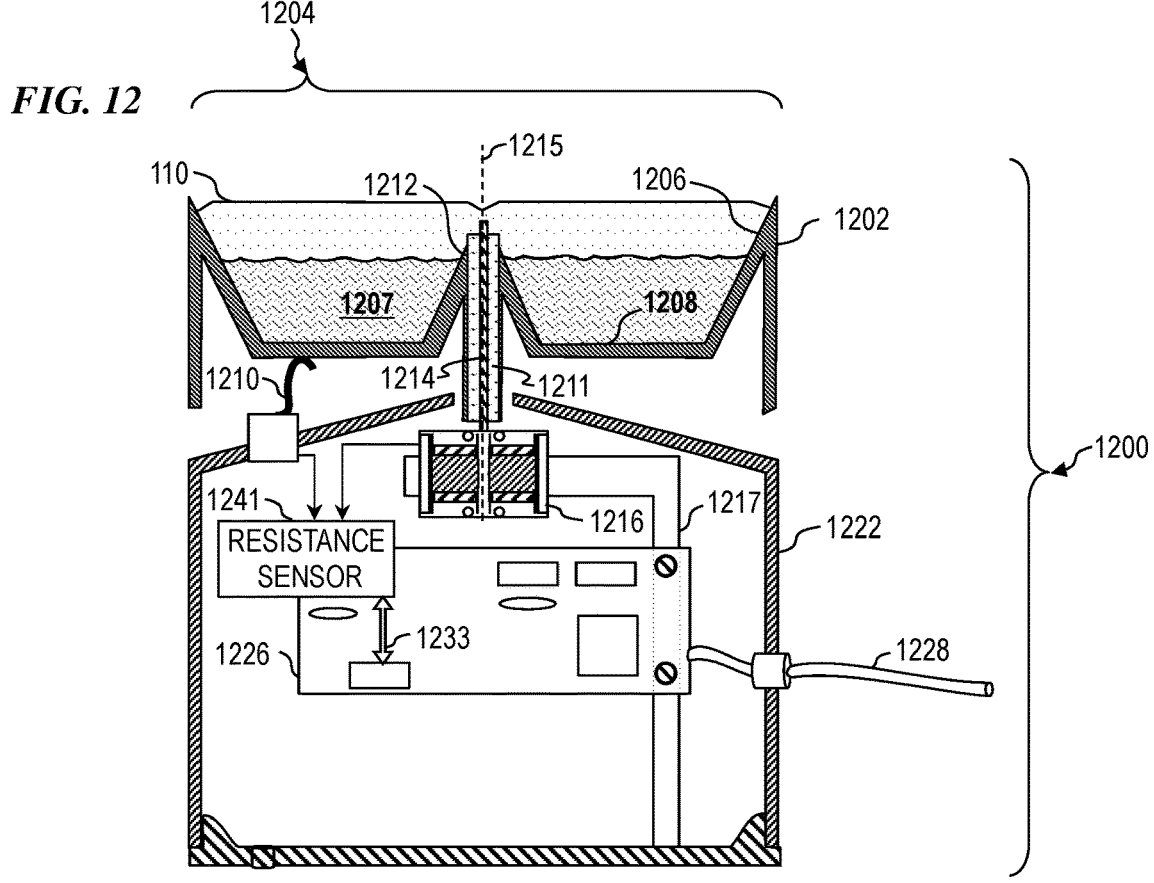
FIG. 12 is a sectional view of a spinning-bowl precipitation gauge 1200 that uses a brushless motor 1216, but the amount of water in bowl 1202 is measured by electrical conductivity rather than by weight, according to some embodiments of the invention.

Yet another embodiment of the invention uses the conductivity of water to measure the presence of water in the bowl, and this is illustrated in FIG. 12. In this embodiment of a spinning bowl precipitation gauge 1200, a collection bowl 1202 is made of a conductive metal. A motor 1216 includes a metal shaft 1214 having rotational axis 1215. Shaft 1214 is insulated from bowl 1202 with an insulator 1211. Shaft 1214 is mechanically coupled to bowl 1202, but is electrically insulated from bowl 1202 by insulator 1211. A brush 1210 is affixed to a housing 1222, such that brush 1210 makes electrical contact with the bottom of bowl 1202. Bowl 1202 may still spin freely, with only minimal mechanical resistance introduced by brush 1210. A conductivity measurement circuit (which may be equivalently referred to as a resistance-measuring circuit or sensor) 1241 is electrically connected to both motor 1216, and to brush 1210. Thus deployed, the conductivity measurement circuit 1241 measures the conductivity between the motor shaft and the metal bowl. In the absence of water, this conductivity is essentially zero, or, for practical purposes, infinite resistance. When bowl 1202 fills with water 1207 above the insulator 1211, the water touches motor shaft 1214 and completes the electrical circuit between conductive bowl 1201 (e.g., in some embodiments, made of a suitable metal, such as copper, aluminum or stainless steel) and motor shaft 1214, and the conductivity circuit 1241 measures a relatively low resistance and communicates corresponding data 1233 to controller 1226. Thus, based on data 1233, control circuit 1226 determines that bowl 1202 is full, and spins bowl 1202 to empty it. Overall operation of the invention is similar to the prior weight-based embodiment. In some embodiments, bowl 1202 includes a sloped inner surface 1212, a flat bottom surface 1208, a sloped outer surface 1206, and radial divider walls 110 to help expel water when motor 1216 spins bowl 1202. In some embodiments, communications cable 1228 goes through housing 1222 and communicates measurement data to external equipment.

Other embodiments of the invention may utilize still other techniques to measure the presence of water, and are not illustrated here. For example, in some embodiments, an ultrasonic sensor is aimed down into the bowl to determine water height. In other embodiments, a float and switch mechanism is used, with connections to the switch made in a manner similar to that of the conductivity measurement described above for FIG. 12. In yet other embodiments, the amount of water in the bowl is measured by precisely measuring the amount of current required to accelerate the bowl, which is a function of the initial and changing inertia of the bowl, and thus the amount of water present. The mass system of bowl and water will have a characteristic resonant frequency, which will change with the presence of water. In some embodiments, this is measured by proper excitation of the motor.

In some embodiments, the present invention provides a first apparatus (a precipitation gauge) that includes: an electronic controller; a precipitation-collection bowl that has an axis of rotation and opens upward; a measurement device operably connected to the controller and configured to measure an amount of collected precipitation in the precipitation-collection bowl and to provide a value to the controller that includes the amount of collected precipitation; a communication device configured to transmit data representing the amount of collected precipitation to equipment external to the precipitation gauge; and a rotation device operably coupled to the precipitation-collection bowl and configured to selectively spin the precipitation-collection bowl around the axis of rotation under control of the controller to empty contents of the precipitation-collection bowl.

In some embodiments of the precipitation gauge, the measuring device includes a weighing device. In some such embodiments, the weighing device comprises a load cell.

In some embodiments of the precipitation gauge, the controller is configured to reject a tare drift value of the load cell.

Some embodiments of the precipitation gauge further include a temperature sensor, wherein the temperature sensor is operatively connected to the controller to provide a temperature value to the controller, and wherein the controller uses the temperature value in calculation of measured precipitation.

Some embodiments of the precipitation gauge further include an anemometer, wherein the anemometer is operatively connected to the controller to provide a value to the controller indicative of wind speed, and wherein the controller uses the wind speed in calculation of measured precipitation.

In some embodiments of the precipitation gauge, the rotation device includes an electrically powered motor. In some such embodiments, the motor spins the precipitation-collection bowl when the amount of collected precipitation exceeds a threshold. In some embodiments, the motor spins the precipitation-collection bowl periodically absent measured precipitation. In some embodiments, the motor spins the precipitation-collection bowl upon detection of a sudden increase in measured precipitation (e.g., by detecting a rate of increase of measured weight that exceeds a predetermined threshold value for the "normal" range of rates of increase in measured weight that would be due to rain or snow) caused by a foreign object in the bowl.

In some embodiments of the precipitation gauge, the precipitation-collection bowl includes sides sloped to facilitate the ejection of precipitation when the bowl is spun.

In some embodiments of the precipitation gauge, the precipitation-collection bowl includes radial dividers.

In some embodiments, the present invention provides a first method for measuring an amount of precipitation. This first method includes: providing an electronic controller; providing a precipitation-collection bowl that has an axis of rotation and opens upward; measuring an amount of precipitation in the precipitation-collection bowl and providing a value of the amount of precipitation to the controller; and selectively spinning the precipitation-collection bowl under control of the controller to empty contents of the precipitation-collection bowl.

In some embodiments of the first method, the measuring includes using a load cell to measure weight.

Some embodiments of the first method further include providing a temperature sensor that outputs temperature data; and using the temperature data to reduce a tare drift of the load cell.

In some embodiments of the first method, the selectively spinning includes using an electrically powered motor.

In some embodiments of the first method, the wherein the motor spins the precipitation-collection bowl when an amount of collected precipitation exceeds a threshold value.

Some embodiments of the first method further include detecting a foreign object in the bowl, wherein the selectively spinning of the bowl is performed upon detection of a foreign object, and wherein the selectively spinning of the bowl is performed periodically in the absence of measured precipitation.

In some embodiments, the present invention provides a second apparatus that includes: means for collecting precipitation, wherein the means for collecting precipitation has an axis of rotation; an electronic controller; means for measuring an amount of precipitation in the means for collection precipitation, and for providing a value based, at least in part, on the amount of precipitation to the controller; and means for selectively spinning the means for collecting precipitation under control of the controller to empty contents of the means for collecting precipitation through the use of centrifugal force.

In some embodiments of the second apparatus, the means for selectively spinning the precipitation-collection bowl includes an electrically powered motor.

In some embodiments, the present invention provides a third apparatus that includes: an electronic controller; a precipitation-collection bowl that has an axis of rotation and an outer-radius top edge; a measurement device operably connected to the controller and configured to measure an amount of precipitation in the precipitation-collection bowl and to provide a value that includes the amount of precipitation to the controller; and a rotation device operably coupled to selectively spin the precipitation-collection bowl around the axis of rotation under control of the controller to empty contents of the precipitation-collection bowl.

In some embodiments of the third apparatus, the rotation device includes an electrically powered motor, and the measurement device measures a weight that includes a weight of the motor plus the precipitation-collection bowl plus the amount of precipitation in the precipitation-collection bowl.

In some embodiments of the third apparatus, the rotation device includes an electrically powered gearmotor.

In some embodiments of the third apparatus, the measurement device measures a weight.

Some embodiments of the third apparatus further include an anemometer operably coupled to provide a value of a wind speed to the controller, wherein the controller is configured to adjust the value of the amount of precipitation based on the value of the wind speed.

In some embodiments of the third apparatus, an anemometer operably coupled to provide a value of a wind speed to the controller, wherein the rotation device includes an electrically powered motor, wherein the measurement device measures a weight that includes a weight of the motor plus the precipitation-collection bowl plus the amount of precipitation in the precipitation-collection bowl, and wherein the controller is configured to adjust the value of the amount of precipitation based on the value of the wind speed.

In some embodiments of the third apparatus, the precipitation-collection bowl includes an upward-facing surface that has a radial cross-section profile, the upward-facing surface having a minimum height surface at a first distance from the axis of rotation, a downward-sloping inner surface between the axis of rotation and the minimum height surface and an upward-sloping inner surface between the minimum height surface and an outer-radius top edge. In some such embodiments of the first apparatus, the radial cross-section profile of the downward-sloping inner surface between the axis of rotation and the minimum height surface is concave and the radial cross-section profile of the upward-sloping inner surface between the minimum height surface and an outer-radius top edge is concave. In some such embodiments of the first apparatus, the radial cross-section profile includes at least a portion of a parabola, or a parabolic section of a parabola.

In some embodiments, the present invention provides a second method that includes: providing a precipitation-collection bowl that has an axis of rotation and an outer-radius top edge; providing an electronic controller; measuring an amount of precipitation in the precipitation-collection bowl and providing a value of the amount of precipitation to the controller; and selectively spinning the precipitation-collection bowl under control of the controller to empty contents of the precipitation-collection bowl.

In some embodiments of the second method, the selectively spinning the precipitation-collection bowl includes using an electrically powered motor that rotates the precipitation-collection bowl around the axis of rotation, and the measuring the amount of precipitation in the precipitation-collection bowl includes measuring a weight that includes a weight of the motor plus the precipitation-collection bowl plus the amount of precipitation in the precipitation-collection bowl.

In some embodiments of the second method, the selectively spinning the precipitation-collection bowl includes using an electrically powered motor.

In some embodiments of the second method, the measuring of the amount of precipitation in the precipitation-collection bowl includes measuring a weight.

Some embodiments of the second method further include: providing a value of a wind speed to the controller, wherein the controller is configured to adjust the value of the amount of precipitation based on the value of the wind speed.

Some embodiments of the second method further include: providing an anemometer operably coupled to provide a value of a wind speed to the controller, wherein the selectively spinning the precipitation-collection bowl includes using an electrically powered motor that rotates the precipitation-collection bowl around the axis of rotation, wherein the measuring an amount of precipitation in the precipitation-collection bowl includes measuring a weight that includes a weight of the motor plus the precipitation-collection bowl plus the amount of precipitation in the precipitation-collection bowl, and adjusting, using the controller, the value of the amount of precipitation based on the value of the wind speed.

In some embodiments of the second method, the measuring of the amount of precipitation in the precipitation-collection bowl includes measuring a weight using a strain gauge.

In some embodiments of the second method, the selectively spinning the precipitation-collection bowl includes using an electrically powered motor, and gradually increasing a spin rate of the motor using pulse-width modulation of electrical power to the motor.

In some embodiments, the present invention provides a fourth apparatus that includes: means for collecting precipitation, wherein the means for collecting precipitation has an axis of rotation; an electronic controller; means for measuring an amount of precipitation in the precipitation-collection bowl and providing a value based, at least in part, on the amount of precipitation to the controller; and means for selectively spinning the means for collecting precipitation under control of the controller to empty contents of the means for collecting precipitation. Some embodiments of the fourth apparatus further include means for communicating the value to equipment external to the fourth apparatus.

In some embodiments of the fourth apparatus, the means for selectively spinning the means for collecting precipitation includes an electrically powered motor.

Some embodiments of the fourth apparatus further include means for providing a value of a wind speed to the controller.

In some embodiments of the fourth apparatus, the means for measuring comprises means for measuring weight.

In some embodiments of the fourth apparatus, the means for measuring comprises a load cell used to measure weight.

In some embodiments of the fourth apparatus, the means for measuring further includes: means for measuring a temperature value; and means for compensating for tare drift of the load cell using the temperature value.

In some embodiments of the fourth apparatus, the means for selectively spinning is controlled based at least in part on whether an amount of collected precipitation exceeds a threshold value.

Some embodiments of the fourth apparatus further include means for detecting a foreign object in the bowl, wherein the means for selectively spinning is controlled based at least in part on detection of the foreign object.

In some embodiments of the fourth apparatus, the means for selectively spinning spins the bowl periodically even in the absence of measured precipitation.

In some embodiments of the fourth apparatus, the means for collecting precipitation includes sides sloped to facilitate the ejection of precipitation when spun, and one or more radial dividers.

Although the description above contains many specifics, these should not be construed as limiting the scope of the invention but as merely providing illustrations of some of the presently preferred embodiments of the invention. Thus the scope of the invention should be determined by the appended claims and their legal equivalents, rather than by the examples given.

Although the detailed description set forth above contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and sub-combinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

What is claimed is:

1. A precipitation gauge comprising:
an electronic controller;
a precipitation-collection bowl that has a vertical axis of rotation and opens upward;
a measurement device operably connected to the controller and configured to measure an amount of collected precipitation in the precipitation-collection bowl and to provide a value to the controller that includes the amount of collected precipitation;
a communication device configured to transmit data representing the amount of collected precipitation to equipment external to the precipitation gauge; and

US 12,656,529 B1

21 a rotation device operably coupled to the precipitation-collection bowl and configured to selectively spin the precipitation-collection bowl around the vertical axis of rotation under control of the controller to empty contents of the precipitation-collection bowl by centrifugal force.

2. The precipitation gauge of claim 1, wherein the measuring device comprises a weighing device.

3. The precipitation gauge of claim 2, wherein the weighing device comprises a load cell.

4. The precipitation gauge of claim 3, wherein the controller is configured to reject a tare drift value of the load cell.

5. The precipitation gauge of claim 3, further comprising a temperature sensor, wherein the temperature sensor is operatively connected to the controller to provide a temperature value to the controller, and wherein the controller uses the temperature value in calculation of measured precipitation.

6. The precipitation gauge of claim 3, further comprising an anemometer, wherein the anemometer is operatively connected to the controller to provide a value to the controller indicative of wind speed, and wherein the controller uses the wind speed in calculation of measured precipitation.

7. The precipitation gauge of claim 1, wherein the rotation device includes an electrically powered motor.

8. The precipitation gauge of claim 7, wherein the motor spins the precipitation-collection bowl around the vertical axis of rotation when the amount of collected precipitation exceeds a threshold.

9. The precipitation gauge of claim 7, wherein the motor spins the precipitation-collection bowl around the vertical axis of rotation periodically absent measured precipitation.

10. The precipitation gauge of claim 7, wherein the motor spins the precipitation-collection bowl around the vertical axis of rotation upon detection of a sudden increase in measured precipitation caused by a foreign object in the bowl.

11. The precipitation gauge of claim 1, wherein the precipitation-collection bowl includes sides sloped to facilitate the ejection of precipitation by centrifugal force when the bowl is spun.

12. The precipitation gauge of claim 1, wherein the precipitation-collection bowl includes radial dividers.

13. A method for measuring an amount of precipitation, the method comprising:
providing an electronic controller;
providing a precipitation-collection bowl that has an axis of rotation and opens upward;
measuring an amount of precipitation in the precipitation-collection bowl and providing a value of the amount of precipitation to the controller;
communicating the value from the controller to an external device; and
selectively spinning the precipitation-collection bowl under control of the controller to empty contents of the precipitation-collection bowl by centrifugal force.

14. The method of claim 13, wherein the measuring comprises measuring weight.

15. The method of claim 13, wherein the measuring comprises using a load cell to measure weight.

16. The method of claim 13, wherein the measuring further comprises:
using a load cell to measure weight;
measuring a temperature value; and

compensating for tare drift of the load cell using the temperature value.

17. The method of claim 13, wherein the selectively spinning includes using an electrically powered motor.

18. The method of claim 13, wherein the selectively spinning is based at least in part on detecting whether an amount of collected precipitation exceeds a threshold value.

19. The method of claim 13, further comprising:
detecting a foreign object in the bowl, wherein the selectively spinning is based at least in part on detection of the foreign object.

20. The method of claim 13, wherein the selectively spinning of the bowl is performed periodically even in the absence of measured precipitation.

21. The method of claim 13, wherein the axis of rotation of the precipitation-collection bowl is a vertical axis of rotation.

22. An apparatus comprising:
means for collecting precipitation, wherein the means for collecting precipitation has an axis of rotation;
means for measuring an amount of precipitation in the means for collection precipitation, and for providing a measured value based, at least in part, on the amount of precipitation;
means for communicating the value to equipment external to the apparatus; and
means for selectively spinning the means for collecting precipitation around the axis of rotation based at least in part on the measured value to empty contents of the means for collecting precipitation through the use of centrifugal force.

23. The apparatus of claim 22, wherein the means for selectively spinning the precipitation-collection bowl includes an electrically powered motor.

24. The apparatus of claim 22, wherein the means for measuring comprises means for measuring weight.

25. The apparatus of claim 22, wherein the means for measuring comprises a load cell used to measure weight.

26. The apparatus of claim 25, wherein the means for measuring further comprises:
means for measuring a temperature value; and
means for compensating for tare drift of the load cell using the temperature value.

27. The apparatus of claim 22, wherein the means for selectively spinning includes an electrically powered motor.

28. The apparatus of claim 22, wherein the means for selectively spinning is controlled based at least in part on whether an amount of collected precipitation exceeds a threshold value.

29. The apparatus of claim 22, further comprising:
means for detecting a foreign object in the bowl, wherein the means for selectively spinning is controlled based at least in part on detection of the foreign object.

30. The apparatus of claim 22, wherein the means for selectively spinning spins the bowl periodically even in the absence of measured precipitation.

31. The apparatus of claim 22, wherein the means for collecting precipitation includes sides sloped to facilitate the ejection of precipitation when spun, and one or more radial dividers.

32. The apparatus of claim 22, wherein the axis of rotation of the means for collecting precipitation is a vertical axis of rotation.

* * * * *